US012451939B2

(12) United States Patent
Ma et al.

(10) Patent No.: US 12,451,939 B2
(45) Date of Patent: Oct. 21, 2025

(54) METHOD AND APPARATUS FOR MONITORING CONTROL CHANNEL, CHIP, DEVICE, AND STORAGE MEDIUM (71) Applicant: GREATER SHINE LIMITED, New Taipei (TW)

(72) Inventors: Ruifeng Ma, Beijing (CN); Chao Han, Beijing (CN)

(73) Assignee: GREATER SHINE LIMITED, New Taipei (TW)

( * ) Notice: Subject to any disclaimer, the term of this patent is extended or adjusted under 35 U.S.C. 154(b) by 145 days.

(21) Appl. No.: 18/401,123

(22) Filed: Dec. 29, 2023

(65) Prior Publication Data

US 2025/0088231 A1  Mar. 13, 2025

(30) Foreign Application Priority Data

Sep. 12, 2023  (CN) .......................... 202311176354.7

(51) Int. Cl.
*H04B 7/06* (2006.01)
*H04B 17/26* (2015.01)
*H04W 72/1273* (2023.01)
*H04W 72/542* (2023.01)

(52) U.S. Cl.
CPC .......... *H04B 7/0602* (2013.01); *H04B 17/26* (2015.01); *H04W 72/1273* (2013.01); *H04W 72/542* (2023.01)

(58) Field of Classification Search
CPC .... H04B 7/0602; H04B 17/26; H04B 7/0802; H04B 7/0874; H04W 72/1273; H04W 72/542; H04W 52/0216; H04W 52/0229; H04W 52/028; H04W 76/28; H04L 5/005
See application file for complete search history.

(56) References Cited

U.S. PATENT DOCUMENTS

2020/0029274 A1* 1/2020 Cheng .................... H04W 76/28
2021/0168714 A1* 6/2021 Guan .................... H04W 52/16

FOREIGN PATENT DOCUMENTS

CN  112312574 A  2/2021

* cited by examiner

*Primary Examiner* — Sung S Ahn
(74) *Attorney, Agent, or Firm* — BAYES PLLC (57) ABSTRACT Embodiments of the present disclosure disclose a method and apparatus for monitoring a control channel, a chip, a device, and a storage medium, and relate to the field of communication technology. The method includes: receiving downlink control information (DCI) sent by a network device, the DCI including configuration selection information, the configuration selection information indicating an antenna switching configuration; determining a target receiving antenna number based on the antenna switching configuration indicated by the configuration selection information; and monitoring a control channel through an antenna with the target receiving antenna number.

20 Claims, 7 Drawing Sheets

METHOD AND APPARATUS FOR MONITORING CONTROL CHANNEL, CHIP, DEVICE, AND STORAGE MEDIUM

CROSS-REFERENCE TO RELATED APPLICATION

This application claims the priority of Chinese patent application No. 202311176354.7, filed on Sep. 12, 2023, the contents of which is hereby incorporated by reference in its entirety.

BACKGROUND

To improve a communication quality of a terminal device, the terminal device may generally be provided with multiple antennas, thereby performing signal transmission and reception through the multiple antennas.

To ensure the quality of signal reception, the terminal device may generally perform signal reception by using a larger number of receiving antennas. However, when performing signal reception by using multiple receiving antennas, the power consumption of the terminal device will be increased dramatically.

SUMMARY

Embodiments of the present disclosure relate to the field of communication technology, and particularly to a method and apparatus for monitoring a control channel, a chip, a device, and a storage medium. The technical solutions are as follows.

In an aspect, embodiments of the present disclosure provide a method for monitoring a control channel. The method is applied to a terminal device. The method includes operations as follows.

Downlink control information (DCI) sent by a network device is received. The DCI includes configuration selection information. The configuration selection information indicates an antenna switching configuration.

A target receiving antenna number is determined based on the antenna switching configuration indicated by the configuration selection information.

A control channel is monitored through an antenna with the target receiving antenna number.

In another aspect, embodiments of the present disclosure provide a method for monitoring a control channel. The method is applied to a network device. The method includes operations as follows.

Downlink control information (DCI) is sent to a terminal device. The DCI includes configuration selection information. The configuration selection information indicates an antenna switching configuration. Accordingly, the terminal device determines a target receiving antenna number based on the antenna switching configuration indicated by the configuration selection information, and monitors a control channel through the at least one antenna with the target receiving antenna number.

In another aspect, embodiments of the present disclosure provide a terminal device. The terminal device includes a processor and a memory. The memory stores thereon at least one instruction. The at least one instruction is configured to be executed by the processor to implement operations of: receiving downlink control information (DCI) sent by a network device, the DCI comprising configuration selection information, the configuration selection information indicating an antenna switching configuration; determining a target receiving antenna number based on the antenna switching configuration indicated by the configuration selection information; and monitoring a control channel through an antenna with the target receiving antenna number.

In embodiments of the present disclosure, the network device adds, in DCI, configuration selection information indicating an antenna switching configuration, so that a terminal device determines a target receiving antenna number dynamically based on the antenna switching configuration.

BRIEF DESCRIPTION OF THE DRAWINGS

Drawings used in describing embodiments of the present disclosure are introduced briefly for clearer illustration of a technical solution in the embodiments. Note that the drawings described hereinafter refer merely to some embodiments of the present disclosure. A person having ordinary skill in the art may acquire other drawings according to the drawings herein without creative effort.

DETAILED DESCRIPTION

To clearly show a technical problem to be solved, a technical solution, and beneficial effects of the present disclosure, implementation of the present disclosure is further elaborated hereinafter with reference to the drawings.

Figure 1:
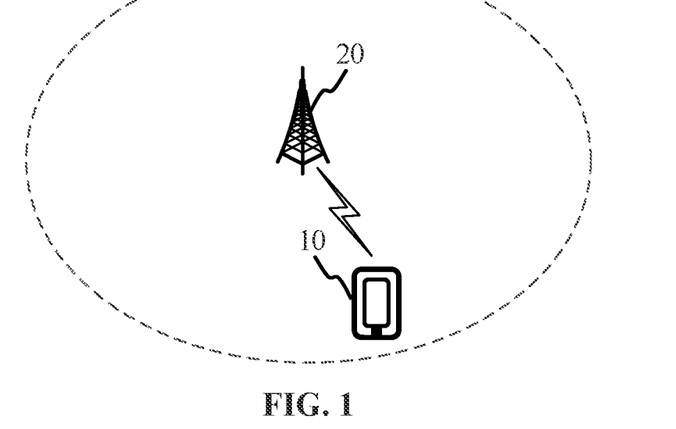
FIG. 1 is a schematic diagram of a system architecture according to an exemplary embodiment of the present disclosure.

FIG. 1 is a schematic diagram of a system architecture according to an exemplary embodiment of the present disclosure. The system architecture may include at least one terminal device 10 and at least one network device 20.

There may generally be multiple terminal devices 10. One or more terminal devices 10 may be distributed within a cell managed by a network device 20. A terminal device 10 may include various handheld devices, on-board devices, wearable devices, computing devices, etc., capable of radio communication, other processing devices connected to a radio modem, various forms of User Equipment (UE), Mobile Stations (MS), etc. For ease of description, an aforementioned device may be collectively referred to as a terminal in embodiments of the present disclosure.

A network device 20 may be an apparatus deployed in an access network to provide a radio communication function to a terminal device 10. The network device 20 may include various forms of macro base stations (BS), micro BSs, relays, access points, etc. In systems using different radio access technologies, devices having network device functions may be given different names. For example, such a device may be referred to as an eNodeB (eNB) in a long term evolution (LTE) system, or a gNodeB (gNB) in a 5th generation (5G) new radio (NR) system. The name "network device" may change as communication technologies evolve. For ease of description, a device providing a radio communication function to a terminal device 10 may be collectively referred to as an network device in embodiments of the present disclosure.

Figure 2:
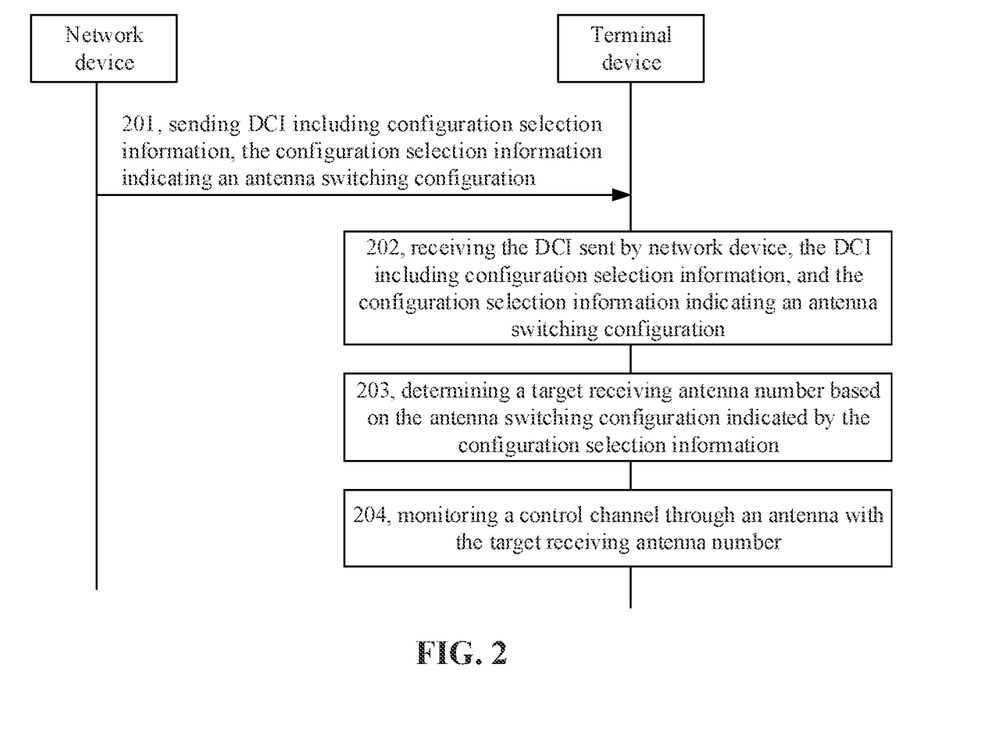
FIG. 2 is a flowchart of a method for monitoring a control channel according to an exemplary embodiment of the present disclosure.

Refer to FIG. 2. FIG. 2 is a flowchart of a method for monitoring a control channel according to an exemplary embodiment of the present disclosure. The embodiment is described taking implementation of the method in an environment illustrated in FIG. 1 as an example. The method may include operations as follows.

At operation 201, a network device sends downlink control information (DCI) to a terminal device. The DCI includes configuration selection information. The configuration selection information indicates an antenna switching configuration.

In a possible implementation, in a discontinuous transmission (DTX) scenario, a network device sends, to a terminal device, downlink control information (DCI) including configuration selection information. In a scenario other than DTX, the network device may send, to the terminal device, DCI including no configuration selection information.

Optionally, the DTX scenario includes a control channel monitoring skip scenario, and an early paging scenario, which is not limited in embodiments of the present disclosure.

In a possible implementation, the configuration selection information includes a specific antenna switching configuration parameter. Additionally or alternatively, the configuration selection information may include a configuration identification. The configuration identification identifies a certain antenna switching configuration in at least one candidate antenna switching configuration.

Note that the antenna switching configuration indicated by the configuration selection information in the DCI may vary with a communication scenario, such as with channel quality, or a bit rate of a downlink control channel.

At operation 202, the terminal device receives the DCI sent by the network device. The DCI includes the configuration selection information. The configuration selection information indicates the antenna switching configuration.

Optionally, in a discontinuous reception (DRX) scenario, the terminal device receives the DCI sent by the network device, and parses the DCI to acquire the configuration selection information.

Optionally, the configuration selection information is located in a specified field of the DCI. In case antenna adjustment is needed, the terminal device may read the configuration selection information from the specified field.

At operation 203, the terminal device determines a target receiving antenna number based on the antenna switching configuration indicated by the configuration selection information.

In a possible implementation, the terminal device estimates channel quality of a control channel based on the antenna switching configuration indicated by the configuration selection information, and determines the target receiving antenna number dynamically based on the channel quality.

Optionally, the terminal device determines the target receiving antenna number based directly on absolute channel quality. Alternatively, based on a quality difference between the absolute channel quality and historical channel quality, the terminal device may determine the target receiving antenna number based on a historical receiving antenna number.

At operation 204, the terminal device monitors a control channel through an antenna with the target receiving antenna number.

As to when to enable the target receiving antenna number of antennas to monitor the control channel, in a possible implementation, in the scenario of the control channel monitoring skip, the terminal device determines the target receiving antenna number within a skipping duration, and monitors the control channel through the target receiving antenna number of antennas in a case that control channel monitoring skip is completed.

In another possible implementation, in the scenario of the early paging, the terminal device determines the target receiving antenna number within a sleep duration of early paging, and monitors the control channel through the antenna with the target receiving antenna number after the sleep of the early paging is ended.

To sum up, in embodiments of the present disclosure, the network device adds, in DCI, configuration selection information indicating an antenna switching configuration, so that a terminal device determines a target receiving antenna number dynamically based on the antenna switching configuration, thereby adjusting the number of antennas used in control channel monitoring, avoiding excessive power consumption due to use of too many antennas as well as the impact on monitoring quality due to use of too few antennas, and balancing the power consumption and quality of control channel monitoring.

As is discovered through experiments, the better the channel quality is, the less antennas the terminal device has to use in control channel monitoring while still achieving a good monitoring result. In addition, in case of a low bit rate of the downlink control channel, the terminal device may also achieve a good monitoring result in control channel monitoring by using just a few antennas. Therefore, taking both the channel bit rate and the channel quality into account, in a possible implementation, the antenna switching configuration includes at least one of a signal power offset or a bit rate offset.

The signal power offset may indicate a power difference between a control signal and a reference signal. The bit rate offset may represent a difference between an estimated transmission bit rate of the control channel and a historical transmission bit rate of the control channel.

The case where the antenna switching configuration includes just the signal power offset, the case where the antenna switching configuration includes just the bit rate offset, and the case where the antenna switching configuration includes both the signal power offset and the bit rate offset are described respectively hereinafter using exemplary embodiments.

Figure 3:
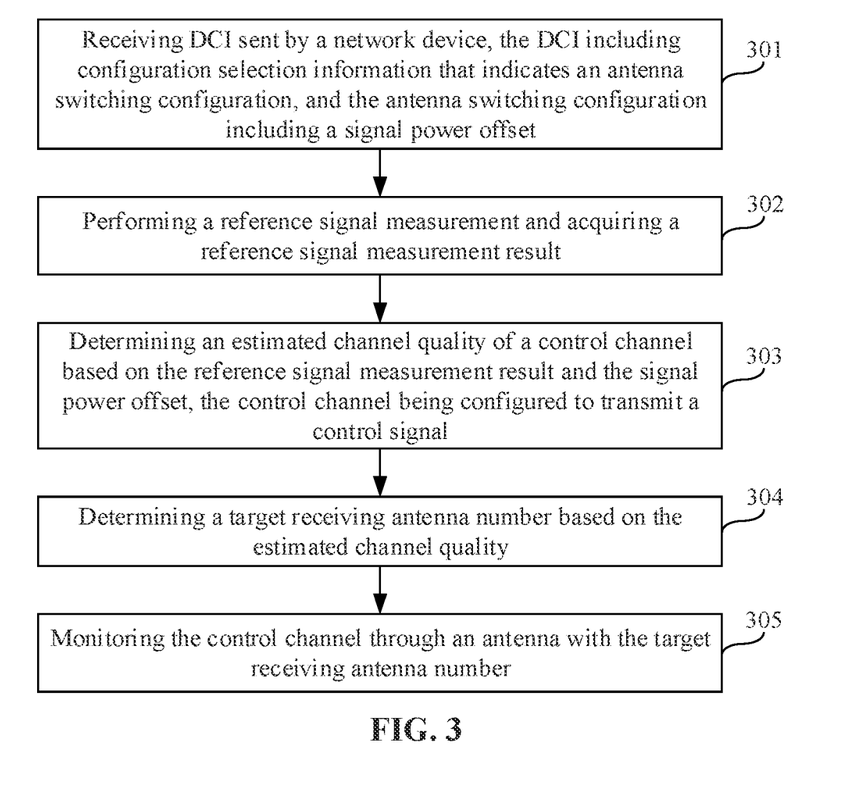
FIG. 3 is a flowchart of a method for monitoring a control channel according to another exemplary embodiment of the present disclosure.

Refer to FIG. 3. FIG. 3 is a flowchart of a method for monitoring a control channel according to another exemplary embodiment of the present disclosure. The embodiment is described taking implementation of the method at a terminal device illustrated in FIG. 1 as an example. The method may include operations as follows.

At operation 301, the terminal device receives downlink control information (DCI) sent by a network device. The DCI includes configuration selection information. The configuration selection information indicates an antenna switching configuration. The antenna switching configuration may include a signal power offset.

Instead of performing measurement directly on a control signal to assess channel quality of a control channel, the terminal device may estimate the channel quality of the control channel indirectly based on a measurement result for a reference signal. In addition, the reference signal and the control signal may not have exactly the same signal power. Therefore, the antenna switching configuration sent by the network device may include the signal power offset indicating the power difference between the power of the control signal and the power of the reference signal.

At operation 302, the terminal device may perform a reference signal measurement and acquire a reference signal measurement result.

In a possible implementation, in the scenario of the control channel monitoring skip, the terminal device acquires the reference signal measurement result by performing a reference signal measurement within a skipping duration. Alternatively, in the scenario of the early paging, the terminal device acquires the reference signal measurement result by performing a reference signal measurement within a sleep duration of early paging.

The terminal device may perform reference signal measurement by estimating channel quality based on a downlink reference symbol in a downlink reference signal.

In some embodiments, the terminal device acquires the reference signal measurement result by performing measurement on a reference signal of a predefined type.

In some other embodiments, the antenna switching configuration further includes a reference signal type. The reference signal type may indicate a type of the to-be-measured reference signal. Optionally, the reference signal type includes a synchronization signal block (SSB), a track reference signal (TRS), a physical broadcast channel (PBCH), etc., which is not limited in embodiments of the present disclosure.

Optionally, the reference signal measurement result includes, but is not limited to, a channel quality indicator (CQI), reference signal received power (RSRP), a signal to interference plus noise ratio (SINR), etc. A specific form in which the reference signal measurement result is manifested is not limited in embodiments of the present disclosure.

Accordingly, the terminal device may perform a reference signal measurement on the reference signal indicated by the reference signal type, and acquire the reference signal measurement result.

At operation 303, the terminal device may determine an estimated channel quality of a control channel based on the reference signal measurement result and the signal power offset. The control channel may be configured to transmit a control signal.

Further, the terminal device may acquire estimated signal quality of the control channel by performing power offset on the reference signal measurement result for the reference signal using the signal power offset.

The signal power offset may represent a difference between transmit power used by the network device in sending the control signal and the reference signal.

In a possible implementation, the terminal device determines estimated power of the control signal based on the reference signal measurement result and the signal power offset, thereby determining the estimated channel quality of the control channel based on the estimated power of the control signal.

For example, when the reference signal measurement result for the reference signal is $PowerMeasRS_1$, and signal offset power between the reference signal and the control signal is $PowerPDCCHtoRS_1$, the estimated channel quality of the control channel $PowerMeasPDCCH_{1est}=(PowerMeasRS_1+PowerPDCCHtoRS_1)$.

Optionally, the estimated channel quality is an equivalent signal to noise ratio (SNR) or an equivalent SINR acquired through signal power based conversion.

In some embodiments, the reference signal measurement result includes the SINR and the RSRP. The terminal device may determine the estimated power of the control signal based on the signal power offset and the RSRP of the reference signal, and then determine an estimated SINR of the control channel based on the estimated power and the SINR of the reference signal. A specific manner of computing the estimated channel quality is not limited in embodiments of the present disclosure.

Optionally, the estimated channel quality represents the absolute channel quality of the control channel.

Optionally, the terminal device further determines a relative channel quality based on a historical channel quality and the absolute channel quality. The relative channel quality may represent a quality difference between the current estimated channel quality and the historical channel quality.

At operation 304, the terminal device may determine a target receiving antenna number based on the estimated channel quality.

A manner used by the terminal device in determining the target receiving antenna number based on the absolute channel quality may differ from a manner used by the terminal device in determining the target receiving antenna number based on the relative channel quality.

In a possible implementation, in case of determining the target receiving antenna number based on the absolute channel quality, the terminal device searches a mapping table for the target receiving antenna number corresponding to the estimated channel quality. The mapping table may include a correspondence between a channel quality and a receiving antenna number.

In some embodiments, the terminal device is provided with a single mapping table.

In some other embodiments, a number of antennas used by the terminal device is further associated with a factor such as a terminal processing capacity, a block error rate requirement, etc. For example, the less the terminal processing capacity is, the more antennas have to be used; and the higher the block error rate requirement on the terminal device, the more antennas have to be used. Therefore, the terminal device may be provided with multiple candidate mapping tables. Each candidate mapping table may correspond to a distinct combination of the terminal processing capacity and the block error rate requirement.

The terminal device may determine, based on at least one of a terminal processing capacity or a block error rate requirement, a target mapping table from candidate mapping tables; and then search the target mapping table for the target receiving antenna number corresponding to the estimated channel quality.

Of course, a candidate mapping table may further be provided based on another dimension such as a bit rate requirement, etc., which is not limited in embodiments of the present disclosure.

In an illustrative example, a mapping table is as shown in Table 1 in case of bit rates 0.06 and 0.1, a block error rate requirement 1%, and an estimated channel quality represented by the SNR.

TABLE 1

| Code rate | Receiving antenna number | SNR threshold (dB) (block error rate 1%) |
|---|---|---|
| 0.06 | 1 | −3.0 |
|  | 2 | −5.8 |
|  | 3 | −7.7 |
|  | 4 | −8.6 |
| 0.1 | 1 | −0.8 |
|  | 2 | −3.6 |
|  | 3 | −5.5 |
|  | 4 | −6.4 |

For example, the terminal device determines the target receiving antenna number to be 2 when the bit rate is 0.06 and the estimated channel quality indicates that the SNR of the control channel is −5 dB. The terminal device may determine the target receiving antenna number to be 3 when the bit rate is 0.1 and the estimated channel quality indicates that the SNR of the control channel is −5 dB.

In another possible implementation, in a case that the target receiving antenna number is to be determined based on a relative channel quality, the terminal device first determines the relative channel quality based on the estimated channel quality and a historical channel quality, and then determines the target receiving antenna number based on a historical receiving antenna number and the relative channel quality.

The terminal device may decrease the number of antennas with respect to the number of historical receiving antennas when the relative channel quality indicates that the current estimated channel quality is better than the historical channel quality. The terminal device may increase the antenna number with respect to the historical receiving antenna number when the relative channel quality indicates that the current estimated channel quality is lower than the historical channel quality.

In some embodiments, a relation between the historical receiving antenna number versus the target receiving antenna number and the relative channel quality may be expressed as follows.

$$10 * \log_{10}\left(\frac{RX_0}{RX_{1_{est}}}\right) = (PowerMeasRS_1 + PowerPDCCHtoRS_1 - PowerMeasPDCCH_0)$$

$RX_0$ is the historical receiving antenna number. $RX_{1_{est}}$ is the target receiving antenna number. The reference signal measurement result is $PowerMeasRS_1$. The signal offset power between the reference signal and the control signal is $PowerPDCCHtoRS_1$. $PowerMeasPDCCH_0$ is the historical channel quality of the control channel. ($PowerMeasRS_1 + PowerPDCCHtoRS_1 - PowerMeasPDCCH_0$) represents the relative channel quality. Note that a result of up-rounding $RX_{1_{est}}$ is the target receiving antenna number when $RX_{1_{est}}$ is not an integer.

At operation 305, the terminal device monitors the control channel through at least one antenna with the target receiving antenna number.

Refer to operation 204 for implementation of the operation, which is not repeated in the embodiment.

Figure 4:
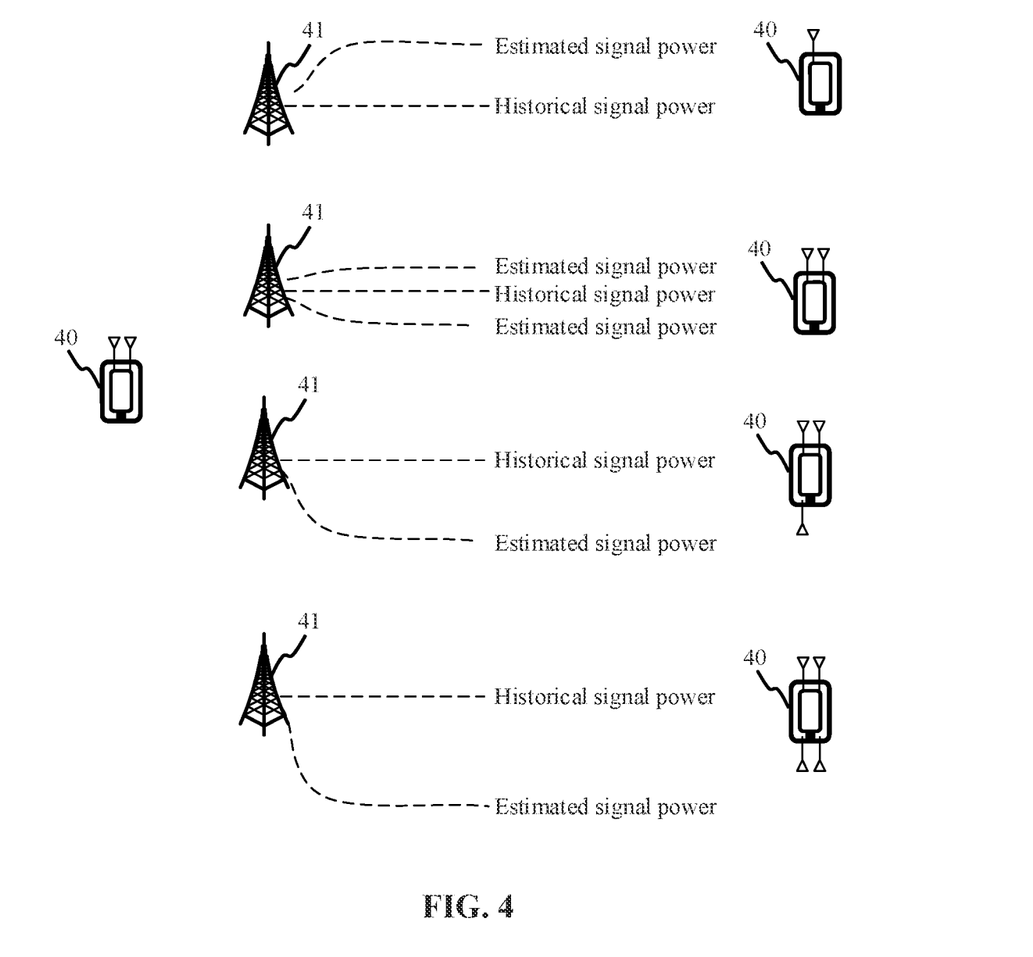
FIG. 4 is a schematic diagram of a process of adjusting a receiving antenna number according to an exemplary embodiment of the present disclosure.

In an illustrative example, as illustrated in FIG. 4, in an initial state, the terminal device 40 performs control channel monitoring on the network device 41 through 2 antennas. The terminal device 40 may lower the receiving antenna number to 1 when the estimated signal power is much higher than the historical signal power (i.e., the channel quality improves dramatically). The terminal device 40 may maintain the 2 receiving antennas when the estimated signal power is slightly higher than the historical signal power, or is slightly lower than the historical signal quality (i.e., the channel quality basically remains unchanged). The terminal device 40 may increase the receiving antenna number to 3 when the estimated signal power is lower than the historical signal power by a small amount (i.e., the channel quality lowers by a small amount). The terminal device 40 may increase the receiving antenna number to 4 when the estimated signal power is dramatically lower than the historical signal power (i.e., the channel quality lowers dramatically).

In the embodiment, based on a measurement result for a reference signal, and a signal power offset representing a signal power difference between power of the reference signal and power of the control signal, the terminal device estimates a channel quality of a control channel, and then determines a target receiving antenna number based on the channel quality, which allows to decrease a receiving antenna number in a case that the channel quality improves, thereby lowering power consumption; and to increase the receiving antenna number in a case that the channel quality worsens, thereby improving quality of channel monitoring.

Figure 5:
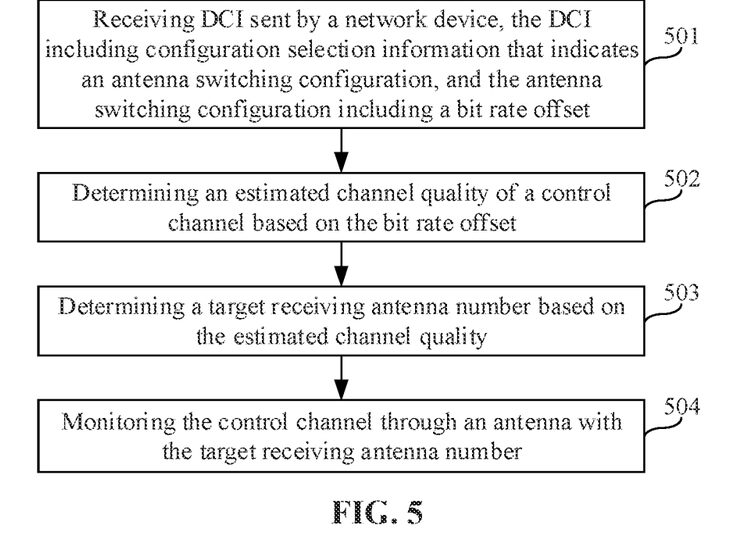
FIG. 5 is a flowchart of a method for monitoring a control channel according to another exemplary embodiment of the present disclosure.

Refer to FIG. 5. FIG. 5 is a flowchart of a method for monitoring a control channel according to another exemplary embodiment of the present disclosure. The embodiment is described taking implementation of the method at a terminal device illustrated in FIG. 1 as an example. The method may include operations as follows.

At operation 501, the terminal device receives downlink control information (DCI) sent by a network device. The DCI includes configuration selection information. The configuration selection information indicates an antenna switching configuration. The antenna switching configuration may include a bit rate offset.

A transmission bit rate of the network device may change, and a number of receiving antennas to be used by the terminal device is associated with the transmission bit rate. Therefore, to enable the terminal device to adjust a receiving antenna number dynamically according to the transmission bit rate, an antenna switching configuration sent by the network device may include a bit rate offset. The bit rate offset may represent a difference between an estimated transmission bit rate of the control channel and a historical transmission bit rate of the control channel.

Optionally, the bit rate offset is represented by a logarithmic offset decibel value.

Optionally, the estimated transmission bit rate is a bit rate of a first-time transmission after a monitoring skip, or a bit rate of a first-time early paging DCI transmission after a sleep is ended, which is not limited in the embodiment.

In a possible implementation, the estimated transmission bit rate is determined in at least one manner as follows.

In manner 1, the network device may determine the estimated transmission bit rate as a maximum likelihood bit rate or a statistical average bit rate of control channels (physical downlink control channels, PDCCHs) with the same type in the whole cell.

In manner 2, the network device may determine the estimated transmission bit rate as a highest possible bit rate, a maximum likelihood bit rate, or a statistical average bit rate of control channels (PDCCHs) of a single terminal or a group of terminals. Terminals may be grouped based on UE grouping in an early paging design in RELEASE-17.

Further, the network device may determine the bit rate offset based on the estimated transmission bit rate and the historical transmission bit rate of a most recent control channel transmission.

At operation 502, the terminal device may determine an estimated channel quality of the control channel based on the bit rate offset.

The historical transmission bit rate of the network device is known to the terminal device. Therefore, the terminal device may determine the estimated transmission bit rate based on the historical transmission bit rate and the bit rate offset, and then determine the estimated channel quality based on the estimated transmission bit rate.

Optionally, the estimated channel quality is an equivalent SNR or an equivalent SINR acquired through the transmission bit rate based conversion.

In a possible implementation, the terminal device acquires an estimated transmission bit rate of the control channel by performing compensation on the historical transmission bit rate based on the bit rate offset, and then determines the estimated channel quality of the control channel based on the estimated transmission bit rate, the historical transmission bit rate, and a historical channel quality of the control channel. The historical channel quality may refer to the channel quality of the control channel at the historical transmission bit rate.

Optionally, the estimated channel quality represents the absolute channel quality of the control channel. The estimated channel quality is negatively correlated with the estimated transmission bit rate. That is, the higher the estimated transmission bit rate is, the poorer the estimated channel quality, and the more receiving antennas may have to be used; and the lower the estimated transmission bit rate is, the better the estimated channel quality, and the less receiving antennas may have to be used.

Illustratively, the estimated channel quality of the control channel PowerMeasPDCCH$_{1est}$=(CR_PDCCH$_0$+PDCCH_CR_Change$_1$). The historical transmission bit rate of the control channel is CR_PDCCH$_0$. The bit rate offset is PDCCH_CR_Change$_1$.

In another possible implementation, the terminal device also determines the relative channel quality of the control channel based on the bit rate offset. The relative channel quality may represent the quality difference between the estimated channel quality and the historical channel quality.

At operation 503, the terminal device may determine a target receiving antenna number based on the estimated channel quality.

A manner used by the terminal device in determining the target receiving antenna number based on the absolute channel quality may differ from a manner used by the terminal device in determining the target receiving antenna number based on the relative channel quality.

In a possible implementation, in case of determining the target receiving antenna number based on the absolute channel quality, the terminal device searches a mapping table for the target receiving antenna number corresponding to the estimated channel quality. The mapping table may include a correspondence between a channel quality and a receiving antenna number.

Optionally, a number of antennas used by the terminal device is further associated with a factor such as a terminal processing capacity, a block error rate requirement, etc. For example, the less the terminal processing capacity is, the more antennas have to be used; and the higher the block error rate requirement on the terminal device, the more antennas have to be used. Therefore, the terminal device may be provided with multiple candidate mapping tables. Each candidate mapping table may correspond to a distinct combination of the terminal processing capacity and the block error rate requirement.

The terminal device may determine, based on at least one of a terminal processing capacity or a block error rate requirement, a target mapping table from candidate mapping tables; and then search the target mapping table for the target receiving antenna number corresponding to the estimated channel quality.

Of course, a candidate mapping table may further be provided based on another dimension such as a bit rate requirement, etc., which is not limited in embodiments of the present disclosure.

In another possible implementation, in a case that the target receiving antenna number is to be determined based on a relative channel quality, the terminal device determines the relative channel quality based on the estimated channel quality and a historical channel quality, and thereby determines the target receiving antenna number based on a historical receiving antenna number and the relative channel quality.

The terminal device may decrease the antenna number with respect to the historical receiving antenna number when the relative channel quality indicates that the current estimated channel quality is better than the historical channel quality (due to a lowered transmission bit rate of the control channel). The terminal device may increase the antenna number with respect to the historical receiving antenna number when the relative channel quality indicates that the current estimated channel quality is lower than the historical channel quality (due to an increased transmission bit rate of the control channel).

In some embodiments, a relation between the historical receiving antenna number versus the target receiving antenna number and the relative channel quality may be expressed as follows.

$$10 * \log_{10}\left(\frac{RX_0}{RX_{1_{est}}}\right) = \text{PCCH\_CR\_Change}_1$$

$RX_0$ is the historical receiving antenna number. $RX_{1_{est}}$ is the target receiving antenna number. PDCCH_CR_Change$_1$ is the bit rate offset representing a change in the channel quality caused by a change in the bit rate, i.e., the relative channel quality. Note that a result of up-rounding $RX_{1_{est}}$ is the target receiving antenna number when $RX_{1_{est}}$ is not an integer.

At operation 504, the terminal device monitors the control channel through an antenna with the target receiving antenna number.

Refer to operation 204 for implementation of the operation, which is not repeated in the embodiment.

Figure 6:
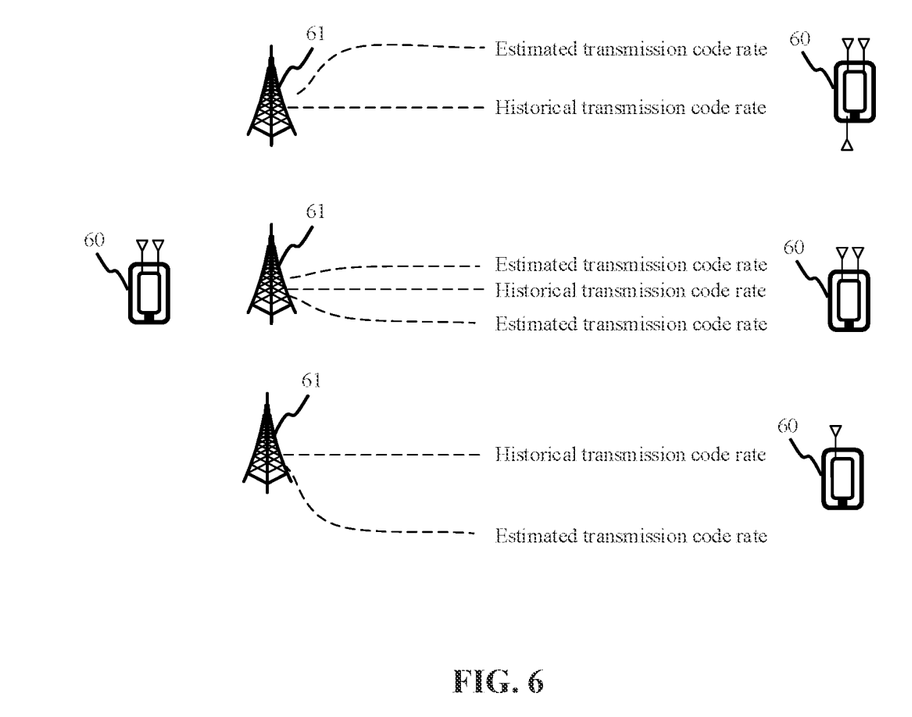
FIG. 6 is a schematic diagram of a process of adjusting a receiving antenna number according to another exemplary embodiment of the present disclosure.

In an illustrative example, as illustrated in FIG. 6, in an initial state, the terminal device 60 performs control channel monitoring on the network device 61 through 2 antennas. The terminal 60 may increase the receiving antenna number to 3 when the estimated transmission bit rate is dramatically higher than the historical transmission bit rate (i.e., the channel quality lowers dramatically). The terminal device 60 may maintain the 2 receiving antennas when the estimated transmission bit rate is slightly higher or lower than the historical transmission bit rate (i.e., the channel quality basically remains unchanged). The terminal device 60 may decrease the receiving antenna number to 1 when the estimated transmission bit rate is dramatically lower than the historical transmission bit rate (i.e., the channel quality improves dramatically).

In the embodiment, the terminal device determines a change in a channel quality of a control channel based on a bit rate offset for the control channel sent by the network device, and then determines a target receiving antenna number based on the change in the channel quality, which allows to decrease a receiving antenna number in a case that the transmission bit rate lowers, thereby lowering power consumption; and to increase the receiving antenna number in a case that the transmission bit rate increases, thereby improving quality of channel monitoring.

Figure 7:
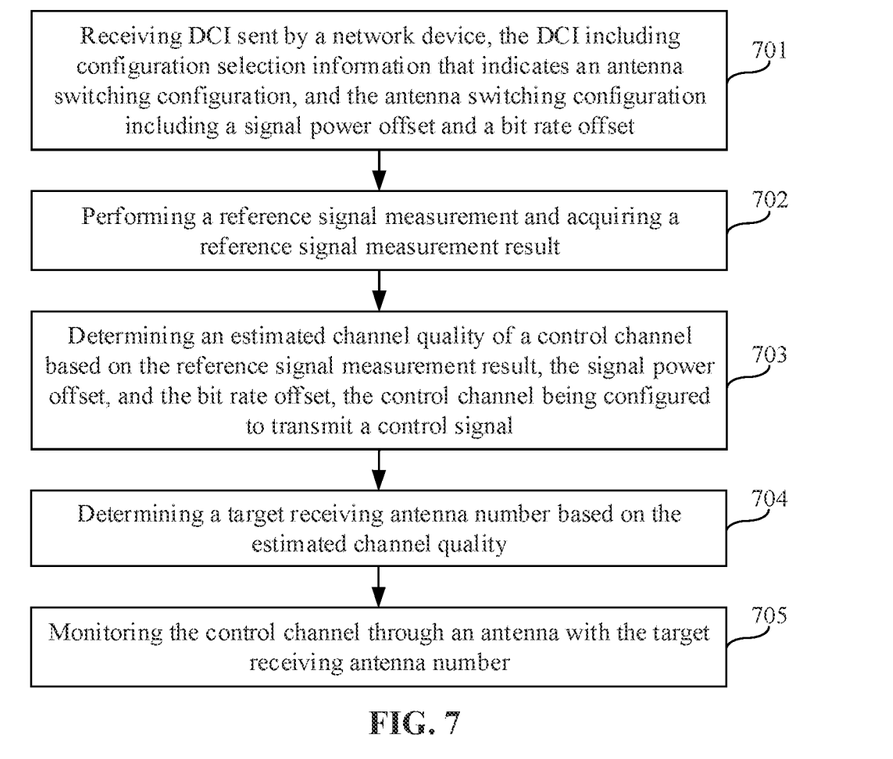
FIG. 7 is a flowchart of a method for monitoring a control channel according to another exemplary embodiment of the present disclosure.

Refer to FIG. 7. FIG. 7 is a flowchart of a method for monitoring a control channel according to another exemplary embodiment of the present disclosure. The embodiment is described taking implementation of the method at a terminal device illustrated in FIG. 1 as an example. The method may include operations as follows.

At operation 701, the terminal device receives downlink control information (DCI) sent by a network device. The DCI includes configuration selection information. The configuration selection information indicates an antenna switching configuration. The antenna switching configuration may include a signal power offset and a bit rate offset.

In the embodiment, the antenna switching configuration sent by the network device includes the signal power offset and the bit rate offset. Accordingly, the terminal device may have to perform channel quality estimation based on both the signal power and the bit rate.

At operation 702, the terminal device may perform a reference signal measurement and acquire a reference signal measurement result.

Refer to operation 302 for implementation of the operation, which is not repeated in the embodiment.

At operation 703, the terminal device may determine an estimated channel quality of a control channel based on the reference signal measurement result, the signal power offset, and the bit rate offset. The control channel is configured to transmit a control signal.

In a possible implementation, the terminal device determines the estimated channel quality of the control channel by considering both impact of the signal power on the channel quality and impact of the bit rate on the channel quality.

In some embodiments, the signal power and the bit rate impact the channel quality to the same extent or to different extents.

Optionally, the respective extents to which the signal power offset and the bit rate offset impact the channel quality correspond respectively to a first impact factor and a second impact factor. Accordingly, the terminal device may determine the estimated channel quality of the control channel based on the reference signal measurement result, the signal power offset, the first impact factor corresponding to signal power, the bit rate offset, and the second impact factor corresponding to a bit rate.

The first impact factor may be the same as, or different from, the second impact factor.

At operation 704, the terminal device may determine a target receiving antenna number based on the estimated channel quality.

In a possible implementation, the terminal device determines the target receiving antenna number based on the absolute channel quality represented by the estimated channel quality. Alternatively, the terminal device may determine the relative channel quality based on the estimated channel quality and the historical channel quality, thereby determining the target receiving antenna number based on the relative channel quality and the historical receiving antenna number.

In an illustrative example, the absolute channel quality of the control channel PowerMeasPDCCH$_{1est}$=(PowerMeasRS$_1$+PowerPDCCHtoRS$_1$)+ (CR_PDCCH$_0$+PDCCH_CR_Change$_1$). PowerMeasRS$_1$ is the reference signal measurement result for the reference signal, PowerPDCCHtoRS$_1$ is the signal offset power. CR_PDCCH$_0$ is the historical transmission bit rate of the control channel. PDCCH_CR_Change$_1$ is the bit rate offset.

Optionally, based on the absolute channel quality, the terminal device searches a mapping table for a target receiving antenna number corresponding to the absolute channel quality.

In an illustrative example, a relation between the historical receiving antenna number versus the target receiving antenna number and the relative channel quality may be expressed as follows.

$$10 * \log_{10}\left(\frac{RX_0}{RX_{1_{est}}}\right) =$$
$$(PowerMeasRS_1 + PowerPDCCHtoRS_1 - PowerMeasPDCCH_0) +$$
$$PDCCH\_CR\_Chnage_1$$

RX$_0$ is the historical receiving antenna number. RX$_{1_{est}}$ is the target receiving antenna number. PDCCH_CR_Change$_1$ is the bit rate offset representing a change in the channel quality caused by a change in the bit rate. PowerMeasRS$_1$ is the reference signal measurement result for the reference signal. PowerPDCCHtoRS$_1$ is the signal offset power. PowerMeasPDCCH$_0$ is the historical channel quality of the control channel.

At operation 705, the terminal device monitors the control channel through an antenna with the target receiving antenna number.

Refer to operation 204 for implementation of the operation, which is not repeated in the embodiment.

Figure 8:
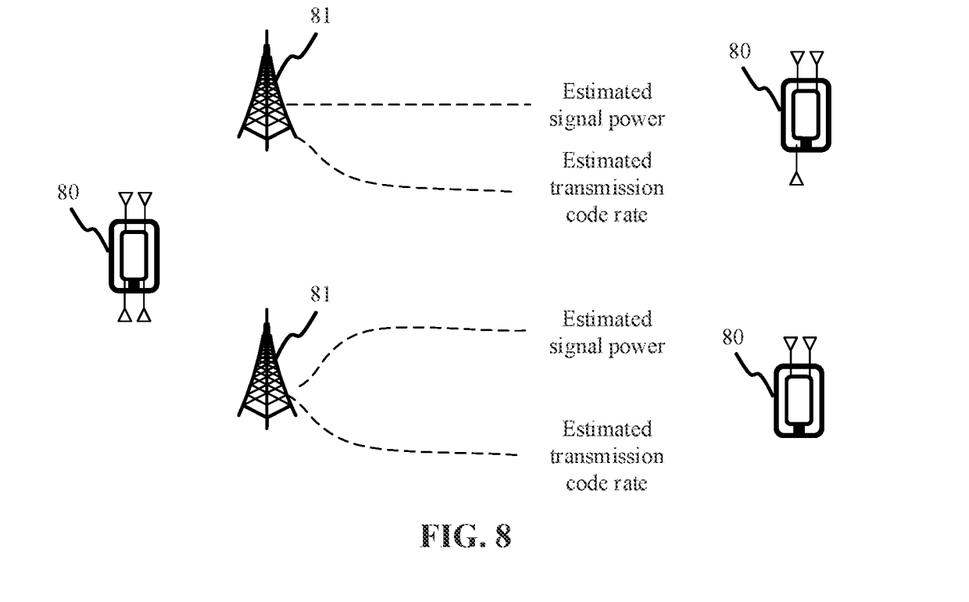
FIG. 8 is a schematic diagram of a process of adjusting a receiving antenna number according to another exemplary embodiment of the present disclosure.

In an illustrative example, as illustrated in FIG. 8, in an initial state, the terminal device 80 performs control channel monitoring on the network device 81 through 4 antennas. The terminal 80 may decrease the receiving antenna number to 3 when the estimated transmission bit rate is significantly lower than the historical transmission bit rate, and the estimated signal power is basically the same as the historical signal power. The terminal 80 may decrease the receiving antenna number to 2 when the estimated transmission bit rate is significantly lower than the historical transmission bit rate, and the estimated signal power is significantly higher than the historical signal power.

As to a manner in which the network device indicates the specific antenna switching configuration, in a possible implementation, the network device sends system information (SI) to the terminal device. The SI may include a set of antenna switching configurations. The set of antenna switching configurations may include at least two antenna switching configurations. Accordingly, after receiving the SI, the terminal device may parse the SI to acquire the set of antenna switching configurations and store the set of antenna switching configurations.

When receiving the DCI subsequently, the terminal device may determine, from the set of antenna switching configurations according to the configuration selection information, the antenna switching configuration.

In an illustrative example, the network device sends the set of antenna switching configurations using a signalling structure as follows.

```
LowPowerCCHAntTransitionStateSet :: =
{
    PDCCHAntTransitionState_0,
    //a first antenna switching configuration
    PDCCHAntTransitionState_1,
    //a second antenna switching configuration
    PDCCHAntTransitionState_2,
    //a third antenna switching configuration
    ......
}
```

Each antenna switching configuration may use a signalling structure as follows.

```
PDCCHAntTransitionState :: =
{
    cell, // a serial number of a cell
    bwp-ID, // a serial number of a bandwidth part
    PowerCodeRateEstOffsetdB, //the bit rate offset
    PowerMeasureRSType {TRS, SSB, PBCH}, //the reference signal type
    PowerOffsetRefRSdB //the signal power offset
}
```

As to a manner of indicating, in the DCI, the antenna switching configuration, in a possible implementation, an indication field in the DCI that indicates the antenna switching configuration is of X bits, and indicates one or more groups of antenna switching configurations using a bit map. For example, the indication field is of 8 bits. A value 00010000 of the indication field may indicate use of a fifth antenna switching configuration. A value 00000001 of the indication field may indicate use of the first antenna switching configuration. A value 00010001 of the indication field may indicate use of the first antenna switching configuration and the fifth antenna switching configuration.

In another possible implementation, the indication field in the DCI that indicates the antenna switching configuration is of X bits, and indicates a group of antenna switching configurations through a logarithmic bit manner. For example, the indication field is of 4 bits. A value 0010 of the indication field may indicate use of the third antenna switching configuration. A value 0101 of the indication field may indicate use of the fifth antenna switching configuration.

The network device may send the SI in different manners in different scenarios.

In some embodiments, the network device sends a system information block (SIB) to the terminal device in a scenario of a control channel monitoring skip. The SIB may include the set of antenna switching configurations. Accordingly, the terminal device may receive the SIB sent by the network device, and parse the SIB to acquire the set of antenna switching configurations.

In some other embodiments, the network device sends a radio resource control (RRC) message to the terminal device in a scenario of an early paging. The RRC message may include the set of antenna switching configurations. Accordingly, the terminal device may receive the RRC message sent by the network device, and parse the RRC message to acquire the set of antenna switching configurations.

Moreover, the DCI sent by the network device that indicates the antenna switching configuration may also be in different formats in different scenarios.

In some embodiments, a format of the DCI is DCI 0_1, DCI_0_2, DCI_1_1, or DCI_1_2 in the scenario of the control channel monitoring skip. A format of the DCI may be DCI_2_7 in the scenario of the early paging.

In some embodiments, In some embodiments, the terminal device may return a post-antenna-switch monitoring quality to the network device based on a monitoring result to enable the network device to adjust the bit rate or the power.

Figure 9:
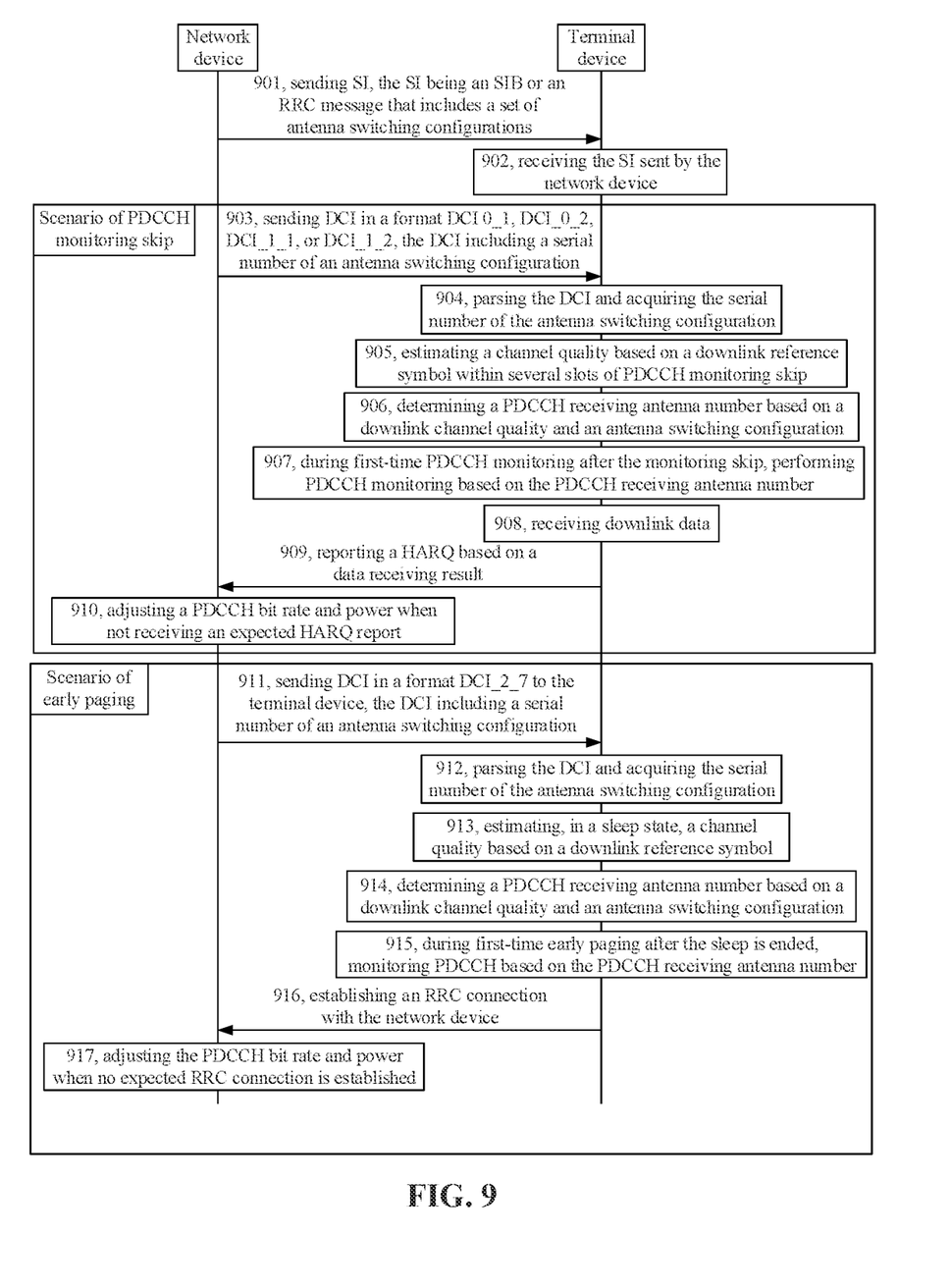
FIG. 9 is a flowchart of a process of dynamically switching an antenna number according to an exemplary embodiment of the present disclosure.

In an illustrative example, as illustrated in FIG. 9, a process in which the terminal device implements dynamic antenna number switching includes operations as follows.

At operation 901, a network device may send SI to a terminal device. The SI may be an SIB or an RRC message including a set of antenna switching configurations.

At operation 902, the terminal device may receive the SI sent by the network device.

At operation 903, in a scenario of a PDCCH monitoring skip, the network device may send, to the terminal device, DCI in a format DCI 0_1, DCI_0_2, DCI_1_1, or DCI_1_2. The DCI may include a serial number of an antenna switching configuration.

At operation 904, the terminal device may parse the DCI and acquire the serial number of the antenna switching configuration.

At operation 905, the terminal device may estimate a channel quality based on a downlink reference symbol within several slots of PDCCH monitoring skip.

At operation 906, the terminal device may determine a PDCCH receiving antenna number based on a downlink channel quality and an antenna switching configuration.

At operation 907, during first-time PDCCH monitoring after the monitoring skip, the terminal device may perform PDCCH monitoring based on the determined PDCCH receiving antenna number.

At operation 908, the terminal device may receive downlink data.

At operation 909, the terminal device may report a hybrid automatic repeat request (HARQ) based on a data receiving result.

At operation 910, the network device may adjust a PDCCH bit rate and power when not receiving the expected HARQ report.

At operation 911, in a scenario of an early paging, the network device may send, to the terminal device, DCI in a format DCI_2_7. The DCI may include a serial number of an antenna switching configuration.

At operation 912, the terminal device may parse the DCI and acquire the serial number of the antenna switching configuration.

At operation 913, the terminal device may estimate, in a sleep state, a channel quality based on a downlink reference symbol.

At operation 914, the terminal device may determine a PDCCH receiving antenna number based on a downlink channel quality and an antenna switching configuration.

At operation 915, during first-time early paging after the sleeping is ended, the terminal device may perform PDCCH monitoring based on the determined PDCCH receiving antenna number.

At operation 916, the terminal device may establish an RRC connection with the network device.

At operation 917, the network device may adjust the PDCCH bit rate and power when the expected RRC connection is not established.

Figure 10:
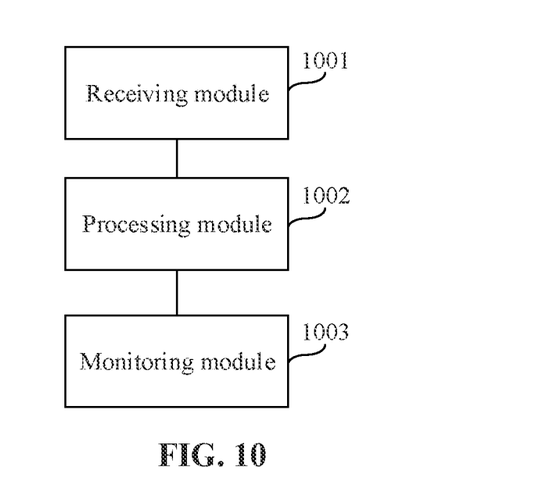
FIG. 10 is a block diagram of a structure of an apparatus for monitoring a control channel according to an exemplary embodiment of the present disclosure.

Refer to FIG. 10. FIG. 10 is a block diagram of a structure of an apparatus for monitoring a control channel according to an exemplary embodiment of the present disclosure. The apparatus may include a receiving module, a processing module, and a monitoring module.

The receiving module 1001 is configured to receive downlink control information (DCI) sent by a network device. The DCI includes configuration selection information. The configuration selection information indicates an antenna switching configuration.

The processing module 1002 is configured to determine a target receiving antenna number based on the antenna switching configuration indicated by the configuration selection information.

The monitoring module 1003 is configured to monitor a control channel through an antenna with the target receiving antenna number.

Optionally, the antenna switching configuration includes at least one of a signal power offset or a bit rate offset.

The signal power offset may indicate a power difference between a control signal and a reference signal. The bit rate offset may represent a difference between an estimated transmission bit rate of the control channel and a historical transmission bit rate of the control channel.

Optionally, the antenna switching configuration includes the signal power offset.

The processing module 1002 may be configured to:
perform a reference signal measurement and acquire a reference signal measurement result;
determine an estimated channel quality of the control channel based on the reference signal measurement result and the signal power offset, the control channel being configured to transmit the control signal; and
determine the target receiving antenna number based on the estimated channel quality.

Optionally, the processing module 1002 is configured to:
determine estimated power of the control signal based on the reference signal measurement result and the signal power offset; and
determine the estimated channel quality of the control channel based on the estimated power of the control signal.

Optionally, the antenna switching configuration further includes a reference signal type. The reference signal type may indicate a type of the to-be-measured reference signal.

The processing module 1002 may be configured to:
perform a reference signal measurement on the reference signal indicated by the reference signal type, and acquire the reference signal measurement result.

Optionally, the antenna switching configuration includes the bit rate offset.

The processing module 1002 may be configured to:
determine an estimated channel quality of the control channel based on the bit rate offset; and
determine the target receiving antenna number based on the estimated channel quality.

Optionally, the processing module 1002 is configured to:
perform compensation on the historical transmission bit rate based on the bit rate offset, and acquire an estimated transmission bit rate of the control channel; and
determine the estimated channel quality of the control channel based on the estimated transmission bit rate, the historical transmission bit rate, and a historical channel quality of the control channel.

Optionally, the antenna switching configuration includes the signal power offset and the bit rate offset.

The processing module 1002 may be configured to:
perform a reference signal measurement and acquire a reference signal measurement result;
determine an estimated channel quality of the control channel based on the reference signal measurement result, the signal power offset, and the bit rate offset, the control channel being configured to transmit the control signal; and
determine the target receiving antenna number based on the estimated channel quality.

Optionally, the processing module 1002 is configured to:
determine the estimated channel quality of the control channel based on the reference signal measurement result, the signal power offset, a first impact factor corresponding to signal power, the bit rate offset, and a second impact factor corresponding to a bit rate.

Optionally, the processing module 1002 is configured to:
search a mapping table for the target receiving antenna number corresponding to the estimated channel quality, the mapping table including a correspondence between a channel quality and a receiving antenna number; or
determine a relative channel quality based on the estimated channel quality and a historical channel quality, and determining the target receiving antenna number based on a historical receiving antenna number and the relative channel quality.

Optionally, the processing module 1002 is configured to:
determine, based on at least one of a terminal processing capacity or a block error rate requirement, a target mapping table from candidate mapping tables; and
search the target mapping table for the target receiving antenna number corresponding to the estimated channel quality.

Optionally, the receiving module 1001 is further configured to receive system information (SI) sent by the network device.

The SI may include a set of antenna switching configurations. The set of antenna switching configurations may include at least two antenna switching configurations.

Optionally, the receiving module 1001 is configured to:
receive a system information block (SIB) sent by the network device in a scenario of a control channel monitoring skip, the SIB including the set of antenna switching configurations; or
receive a radio resource control (RRC) message sent by the network device in a scenario of an early paging. The RRC message may include the set of antenna switching configurations.

Optionally, the monitoring module 1003 is configured to:
monitor the control channel through the antenna with the target receiving antenna number in a case of completing a control channel monitoring skip; or
monitor the control channel through the antenna with the target receiving antenna number after a sleep of an early paging is ended.

Optionally, a format of the DCI is DCI 0_1, DCI_0_2, DCI_1_1, or DCI_1_2 in a scenario of a control channel monitoring skip.

A format of the DCI may be DCI_2_7 in a scenario of an early paging.

Figure 11:
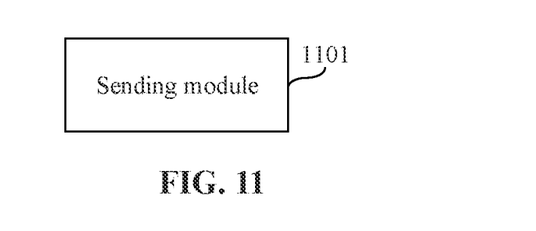
FIG. 11 is a block diagram of a structure of an apparatus for monitoring a control channel according to another exemplary embodiment of the present disclosure.

Refer to FIG. 11. FIG. 11 is a block diagram of a structure of an apparatus for monitoring a control channel according to an exemplary embodiment of the present disclosure. The apparatus may include a sending module.

The sending module 1101 is configured to send downlink control information (DCI) to a terminal device. The DCI includes configuration selection information. The configuration selection information indicates an antenna switching configuration. Thus, the terminal device determines a target receiving antenna number based on the antenna switching configuration indicated by the configuration selection information, and monitors a control channel through an antenna with the target receiving antenna number.

Optionally, the antenna switching configuration includes at least one of a signal power offset or a bit rate offset.

The signal power offset may indicate a power difference between power of a control signal and power of a reference signal. The bit rate offset may represent a difference between an estimated transmission bit rate of the control channel and a historical transmission bit rate of the control channel.

Optionally, the sending module 1101 is configured to send system information (SI) to the terminal device.

The SI may include a set of antenna switching configurations. The set of antenna switching configurations may include at least two antenna switching configurations.

Optionally, the sending module 1101 is configured to:
in a scenario of a control channel monitoring skip, send a system information block (SIB) to the terminal device, the SIB including the set of antenna switching configurations; or
in a scenario of an early paging, send a radio resource control (RRC) message to the terminal device. The RRC message may include the set of antenna switching configurations.

Optionally, a format of the DCI is DCI 0_1, DCI_0_2, DCI_1_1, or DCI_1_2 in a scenario of a control channel monitoring skip.

A format of the DCI may be DCI_2_7 in a scenario of an early paging.

Figure 12:
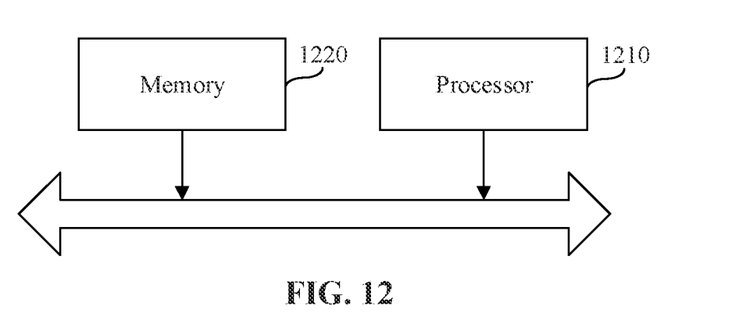
FIG. 12 is a structural diagram of an electronic device according to an exemplary embodiment of the present disclosure.

FIG. 12 is a structural diagram of an electronic device according to an exemplary embodiment of the present disclosure. The electronic device is the terminal device or the network device in a foregoing embodiment. The electronic device may further include one or more of a processor 1210 or a memory 1220.

Optionally, the processor 1210 connects each part in the whole electronic device using various interfaces and lines, and performs various functions of the electronic device and process data by running or executing an instruction, a program, a code set, or an instruction set stored in the memory 1220 and calling data stored in the memory 1220. Optionally, the processor 1210 may be implemented in hardware form of at least one of a digital signal processor (digital signal processing, DSP), a field-programmable gate array (FPGA), a programmable logic array (PLA), etc. The processor 1210 may integrate one or a combination of a central processing unit (CPU), a graphics processing unit (GPU), a neural-network processing unit (NPU), a base band chip, etc. The CPU mainly processes an operating system, a user interface, an application, etc. The GPU is configured to render and plot content to be displayed on a touch display. The NPU is configured to implement artificial intelligence (AI). The base band chip is configured to process radio communication. Understandably, instead of being integrated in the processor 1210, the base band chip may also be implemented as a separate chip.

The memory 1220 may include a random access memory (RAM), and may also include a read-only memory (ROM). Optionally, the memory 1220 includes a non-transitory computer-readable storage medium. The memory 1220 is configured to store an instruction, a program, a code, a code set, or an instruction set. The memory 1220 may include a program storage area and a data storage area. The program storage area may store an instruction configured to implement an operating system, an instruction configured to implement at least one function (such as touch, sound playback, image playback, etc.), an instruction configured to implement a foregoing method embodiment, etc. The data storage area may store data created by using the electronic device, such as audio data, a phone book, etc.

In addition, a person of ordinary skill in the art may understand that a structure of an electronic device illustrated in the drawings does not form any limitation to the electronic device, that more or fewer components may be included in the electronic device compared to those illustrated in the drawings, that some components may be combined, or that components may be deployed differently.

Embodiments of the present disclosure further provide a chip. The chip includes at least one of a programmable logic circuit or a program instruction. When run, the chip implements the method for monitoring a control channel of a foregoing aspect.

Embodiments of the present disclosure further provide a computer-readable storage medium. The computer-readable storage medium stores thereon at least one instruction. The at least one instruction is loaded and executed by a processor to implement the method of a foregoing embodiment. Optionally, the computer-readable storage medium may include a ROM, a RAM, solid state drives (SSD), a compact disc, etc. The RAM may include a resistance random access memory (ReRAM), a dynamic random access memory (DRAM), etc.

Embodiments of the present disclosure further provide a computer program product or a computer program. The computer program product or the computer program may include a computer instruction. The computer instruction is stored in a computer-readable storage medium. A processor of a computer device may read and execute the computer instruction in the computer-readable storage medium, causing the computer device to perform the method provided in various optional implementations of the foregoing aspects.

What described is merely optional embodiments of the present disclosure, and is not intended to limit the present disclosure. Any modification, equivalent replacement, improvement, and/or the like made within the spirit and principle of the present disclosure should be included in the scope of the present disclosure.

What is claimed is:

1. A method for monitoring a control channel, applied to a terminal device, the method comprising:
   receiving downlink control information (DCI) sent by a network device, the DCI comprising configuration selection information, the configuration selection information indicating an antenna switching configuration;
   determining a target receiving antenna number based on the antenna switching configuration indicated by the configuration selection information; and
   monitoring a control channel through an antenna with the target receiving antenna number.

2. The method of claim 1, wherein the antenna switching configuration comprises at least one of a signal power offset or a bit rate offset, wherein the signal power offset indicates a power difference between a control signal and a reference signal, and the bit rate offset represents a difference between an estimated transmission bit rate of the control channel and a historical transmission bit rate of the control channel.

3. The method of claim 2, wherein the antenna switching configuration comprises the signal power offset, wherein determining the target receiving antenna number based on the antenna switching configuration indicated by the configuration selection information comprises:

performing a reference signal measurement and acquiring a reference signal measurement result;

determining an estimated channel quality of the control channel based on the reference signal measurement result and the signal power offset, wherein the control channel is configured to transmit the control signal; and determining the target receiving antenna number based on the estimated channel quality.

4. The method of claim 3, wherein determining the estimated channel quality of the control channel based on the reference signal measurement result and the signal power offset comprises:

determining estimated power of the control signal based on the reference signal measurement result and the signal power offset; and determining the estimated channel quality of the control channel based on the estimated power of the control signal.

5. The method of claim 2, wherein the antenna switching configuration comprises the bit rate offset, wherein determining the target receiving antenna number based on the antenna switching configuration indicated by the configuration selection information comprises:

determining an estimated channel quality of the control channel based on the bit rate offset; and determining the target receiving antenna number based on the estimated channel quality.

6. The method of claim 5, wherein determining the estimated channel quality of the control channel based on the bit rate offset comprises:

performing compensation on the historical transmission bit rate based on the bit rate offset, and acquiring the estimated transmission bit rate of the control channel; and determining the estimated channel quality of the control channel based on the estimated transmission bit rate, the historical transmission bit rate, and a historical channel quality of the control channel.

7. The method of claim 2, wherein the antenna switching configuration comprises the signal power offset and the bit rate offset, wherein determining the target receiving antenna number based on the antenna switching configuration indicated by the configuration selection information comprises:

performing a reference signal measurement and acquiring a reference signal measurement result;

determining an estimated channel quality of the control channel based on the reference signal measurement result, the signal power offset, and the bit rate offset, wherein the control channel is configured to transmit the control signal; and determining the target receiving antenna number based on the estimated channel quality.

8. The method of claim 7, wherein determining the estimated channel quality of the control channel based on the reference signal measurement result, the signal power offset, and the bit rate offset comprises:

determining the estimated channel quality of the control channel based on the reference signal measurement result, the signal power offset, a first impact factor corresponding to signal power, the bit rate offset, and a second impact factor corresponding to a bit rate.

9. The method of claim 3, wherein determining the target receiving antenna number based on the estimated channel quality comprises:

searching a mapping table for the target receiving antenna number corresponding to the estimated channel quality, the mapping table comprising a correspondence between a channel quality and a receiving antenna number; or determining a relative channel quality based on the estimated channel quality and a historical channel quality, and determining the target receiving antenna number based on a historical receiving antenna number and the relative channel quality.

10. The method of claim 9, wherein searching the mapping table for the target receiving antenna number corresponding to the estimated channel quality comprises:

determining a target mapping table from candidate mapping tables based on at least one of a terminal processing capacity or a block error rate requirement; and searching the target mapping table for the target receiving antenna number corresponding to the estimated channel quality.

11. The method of claim 1, further comprising:

receiving system information (SI) sent by the network device, the SI comprising a set of antenna switching configurations, the set of antenna switching configurations comprising at least two antenna switching configurations.

12. The method of claim 11, wherein receiving the SI sent by the network device comprises:

in a scenario of a control channel monitoring skip, receiving a system information block (SIB) sent by the network device, the SIB comprising the set of antenna switching configurations; or in a scenario of an early paging, receiving a radio resource control (RRC) message sent by the network device, the RRC message comprising the set of antenna switching configurations.

13. The method of claim 1, wherein monitoring the control channel through the antenna with the target receiving antenna number comprises:

monitoring the control channel through the antenna with the target receiving antenna number in a case of completing a control channel monitoring skip; or monitoring the control channel through the antenna with the target receiving antenna number after a sleep of an early paging is ended.

14. The method of claim 1, wherein in a scenario of a control channel monitoring skip, a format of the DCI is DCI_0_1, DCI_0_2, DCI_1_1, or DCI_1_2;

in a scenario of an early paging, the format of the DCI is DCI_2_7.

15. A method for monitoring a control channel, applied to a network device, the method comprising:

sending downlink control information (DCI) to a terminal device, the DCI comprising configuration selection information, the configuration selection information indicating an antenna switching configuration, causing the terminal device to determine a target receiving antenna number based on the antenna switching configuration indicated by the configuration selection information, and monitor a control channel through an antenna with the target receiving antenna number.

16. The method of claim 15, wherein the antenna switching configuration comprises at least one of a signal power offset or a bit rate offset, wherein the signal power offset indicates a power difference between a control signal and a reference signal, and the bit rate offset represents a difference between an estimated transmission bit rate of the control channel and a historical transmission bit rate of the control channel.

17. The method of claim 15, further comprising:

sending system information (SI) to the terminal device, the SI comprising a set of antenna switching configurations, the set of antenna switching configurations comprising at least two antenna switching configurations.

18. The method of claim 17, wherein sending the SI to the terminal device comprises:

in a scenario of a control channel monitoring skip, sending a system information block (SIB) to the terminal device, the SIB comprising the set of antenna switching configurations; or in a scenario of an early paging, sending a radio resource control (RRC) message to the terminal device, the RRC message comprising the set of antenna switching configurations.

19. The method of claim 15, wherein in a scenario of a control channel monitoring skip, a format of the DCI is DCI 0_1, DCI_0_2, DCI_1_1, or DCI_1_2; and in a scenario of an early paging, a format of the DCI is DCI_2_7.

20. A terminal device, comprising a processor and a memory, the memory storing thereon at least one instruction, and the at least one instruction being configured to be executed by the processor to implement operations of:

receiving downlink control information (DCI) sent by a network device, the DCI comprising configuration selection information, the configuration selection information indicating an antenna switching configuration;

determining a target receiving antenna number based on the antenna switching configuration indicated by the configuration selection information; and monitoring a control channel through an antenna with the target receiving antenna number.

* * * * *